2,951,201
ZERO-TIME INDICATOR

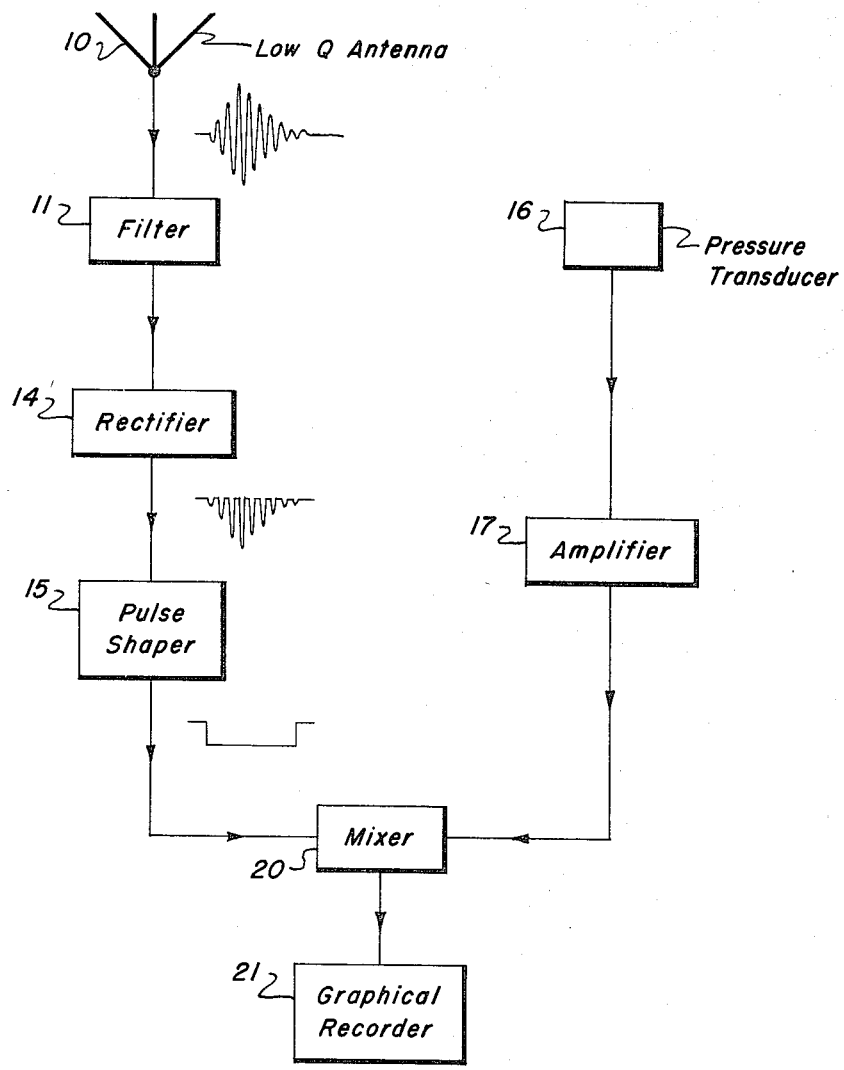

Howard H. Sander, Albuquerque, N. Mex., assignor, by mesne assignments, to the United States of America as represented by the United States Atomic Energy Commission Filed Oct. 9, 1958, Ser. No. 766,369

3 Claims. (Cl. 324—68)

This invention is concerned generally with an electronic system for measuring and recording the travel time to any given point of pressure pulses or shock waves resulting from nuclear detonations. More particularly, it relates to such a system which accomplishes its purpose by employing in a unique manner the electro-magnetic transient associated with such nuclear detonations.

The general object of the invention is to facilitate a more accurate determination of nuclear shock wave travel time.

Shock wave travel time is ordinarily determined by means of a microbarograph recording system located at a desired distance from the point of detonation. Essentially, this involves placing a mark on a graphical trace at the time of detonation, recording the arrival of the pressure pulse on the trace through the amplified output of a suitable pressure transducer and noting the elapsed time with the aid of timing marks on the trace.

Heretofore, the timing of the mark representing the moment of detonation or "zero time" has been determined in one of two ways. An operator may place a mark on the record by closing a switch when, according to scheduled shot time, he counts down to zero on a watch set with Radio Station WWV in Washington, D.C., or he may mark the record when he sees the flash of the detonation. However, the human element involved in either of these methods often results in an error of a second or more in establishing the "zero time" signal.

Ideally, the "zero time" marker signal should be generated automatically by the actual detonation, and that is precisely what this invention makes possible. Besides being more accurate from the standpoint of true "zero time" and automatic marking, such a system has the additional advantage of indicating to a microbarograph operator whether or not a particular detonation actually occurred, a fact which otherwise often has to be relayed to him. The method and apparatus of this invention fulfills these requirements while suffering from none of the disadvantages of the earlier systems.

It was learned some years ago that the detonation of an atomic device above ground is always accompanied by an extremely powerful electromagnetic transient. This transient is now known to be a composite pulse resulting in a damped wave of several cycles in the low frequency range, having a peak somewhere between 7 to 40 kc. Prior to this invention, however, this transient has been nothing but a hindrance, obstructing instrumentation records and often burning out gauges. Great effort has been made to eliminate these undesirable effects by shielding.

Since the "zero time" transient is in the very low frequency range, the inventor surmised correctly that it has characteristics common to other electromagnetic signals in this range. The ionosphere readily reflects low frequencies back to earth with very little absorption. Thus, the action of such a signal, even at considerable distances from the transmitter, is as though the wave were propagated in a sort of waveguide, i.e., in between two concentric reflecting spherical shells, representing the earth and the lower edge of the ionosphere. These signals have consistent propagation characteristics for all times of the year as well as day and night. They travel with low attenuation and are not subject to fading, "skip distances," and seasonal factors such as are characteristic of higher frequency radio waves. The inventor has established conclusively that these low-frequency characteristics of the "zero time" transient enable one to detect it reliably even at great distances.

It is therefore a specific object of this invention to employ this "zero time" detonation transient for a practical purpose, namely, to establish automatically and accurately the time of occurrence of a nuclear detonation at any desired location.

It is now clear that if we can accurately determine "zero time" by means of the nuclear detonation transient, a correspondingly precise measurement of shock-wave travel time by a microbarograph operator is possible. It will be apparent from what follows that the ultimate utility of this invention extends to any phenomena associated with a nuclear detonation which can be transformed into a voltage-time function.

In accordance with this invention, an antenna broadly resonant in the range of 7 to 40 kc. receives the "zero time" nuclear detonation transient. This transient pulse is rectified, shaped and fed into a suitable recorder, thus establishing a "zero time" mark. A suitable pressure transducer senses the arrival of the nuclear shock wave and generates an electrical signal responsive to this wave. After being amplified, this shock wave pulse is also fed to the recorder, preferably isolated from the "zero time" transient circuit by a mixer stage. By means of continuous timing marks on the recorder, it is then possible to determine with great accuracy the "travel time" of the shock wave by noting the time difference between the "zero time" transient and the pressure or shock-wave pulse.

Further features and advantages of this invention will become apparent from the following description and the claims appended thereto, reference being had to the attached drawing forming a part of this specification.

The drawing is a block diagram of the circuitry and apparatus, illustrating a preferred embodiment of this invention.

Referring now to the drawing, antenna 10 is chosen to be broadly resonant in frequency range of 7 to 40 kc., or, expressed otherwise, must have a substantially linear response in that range. This is because experiments have shown that the nuclear detonation transient is invariably strongest in the above range. It is found that the type of antenna used is not critical with these limitations. For very long distance operation, for example at 5000 miles from the detonation, it was learned that either a very large diameter loop or long vertical whip antenna functions successfully. Such antennas are designed so that their response is greatest in the desired frequency range. At shorter distances, for example, within 200 miles one may use a very short telescoping antenna. The short antenna, having a peak response at a high frequency, nevertheless exhibits substantially linear characteristics near the lower limit of the frequency-response curve. With suitable amplification it is entirely acceptable for the purposes of this invention. In either case one should connect to antenna 10 a band pass filter 11 to exclude unwanted signals of other frequencies, although a very long antenna in large measure constitutes its own filter for these low frequencies. The output of filter 11 is connected to rectifier 14 and pulse shaper 15 which complete the zero-time transient circuit. Pulse shaper 15 may consist of a conventional A.C. amplifier, smoothing filter, and clipper, whose functions will be apparent from what follows.

The output of pressure transducer 16 is connected to microbarograph amplifier 17. The outputs of pulse shaper 15 and amplifier 17 are fed into mixer 20, which is in turn connected to graphical recorder 21.

In operation, antenna 10 is excited by a transient signal from a nuclear detonation. The resultant signal is then passed through filter 11, which eliminates undesirable frequencies. The inventor has observed the interesting phenomenon, as illustrated in the drawing, that the nuclear transient is invariably initiated with a negative-going pulse. In order, therefore, to obtain the greatest accuracy in using the initiation of this transient to establish the "zero time" mark, it is necessary to preserve the negative half of the transient in the process of rectification. This is observed in the output of rectifier 14. This rectified signal is now shaped in the manner shown by pulse shaper 15 in such a fashion that it has a sharp pulse front coincident with the first negative-going half cycle of the original transient. The resultant pulse shape is vital in order that graphical recorder 21 will have a strong signal to follow. A "zero time" mark is in this manner established on recorder 21 which is highly accurate owing to its automatic generation by the first negative excursion of the detonation transient.

Pressure transducer 16 now senses the arrival of the nuclear shock wave which follows the detonation transient. Transducer 16 generates a responsive voltage pulse which is then passed through amplifier 17 and mixer 20, which provides suitable isolation from the zero time transient circuit. The shock pulse is then fed to recorder 21 to establish the arrival time of the shock wave. By applying continuous timing marks to recorder 21 at convenient intervals, we can read out the travel time of the shock wave with great accuracy by comparing the zero-time mark and the shock-pulse mark.

The system described above may be physically contained within a unit the size of a small portable radio which facilitates its use in the field. The circuit details of the components described in block form will involve no difficulties for skilled electronic technicians.

It is noted that the method of this invention may be adapted to time measurements concerning other nuclear detonation phenomena such as temperature, dust, and radiation. Those skilled in the art will be able to practice the invention in forms other than the preferred embodiment described and illustrated herein. Clearly, it will be possible to substitute equivalent components without departing from the scope and sphere of the invention as claimed below.

I claim as my invention:

1. A device for automatically determining the travel time of a nuclear shock wave comprising an antenna adapted to receive a zero-time nuclear detonation electromagnetic transient, means connected to the antenna for developing from said transient a sharp pulse coincident with the first negative excursion thereof, pressure transducer means for generating an electrical signal responsive to the nuclear shock wave, means for amplifying said shock wave signal, mixer means adapted to receive said transient pulse and said shock wave signal and combine their respective circuits, and means connected to the output of said mixer for receiving and comparably recording with respect to time said transient pulse and shock wave signal.

2. A device for automatically determining the travel time of a nuclear shock wave comprising an antenna adapted to receive a zero-time nuclear detonation electromagnetic transient, said antenna having a substantially linear response in the frequency range of 7 to 40 kilocycles, means connected to the antenna for developing from said transient a sharp pulse coincident with the first negative excursion thereof, pressure transducer means for generating an electrical signal responsive to the nuclear shock wave, means for amplifying said shock wave signal, mixer means adapted to receive said transient pulse and said shock wave signal and combine their respective circuits, and means connected to the output of said mixer for receiving and comparably recording with respect to time said transient pulse and shock wave signal.

3. A device for automatically determining the travel time of a nuclear shock wave comprising an antenna adapted to receive a zero-time nuclear detonation electromagnetic transient pulse, said antenna having a substantially linear response in the frequency range of 7 to 40 kc., means connected to the antenna and tuned to said frequency range for filtering said transient pulse, means for negatively rectifying said filtered pulse, means for shaping said rectified pulse, pressure transducer means for generating an electrical signal responsive to the nuclear shock wave, means for amplifying said shock wave signal, mixer means adapted to receive said shaped transient pulse and said shock wave signal and combine their respective circuits, and means connected to the output of said mixer for receiving and comparably recording with respect to time said transient pulse and shock wave signal.

References Cited in the file of this patent

UNITED STATES PATENTS

| | | |
|---|---|---|
| 684,706 | Mundy | Oct. 15, 1901 |
| 913,528 | Marriott | Feb. 23, 1909 |
| 1,099,998 | Schiessler | June 16, 1914 |
| 1,706,066 | Karcher | Mar. 19, 1929 |
| 1,843,725 | Karcher | Feb. 2, 1932 |
| 2,099,536 | Scherbatskoy | Nov. 16, 1937 |
| 2,161,764 | Minton | June 6, 1939 |